/ United States Patent (12)
Bharati et al.

(10) Patent No.: US 7,421,490 B2
(45) Date of Patent: Sep. 2, 2008

(54) UNIQUELY IDENTIFYING A CRASHED APPLICATION AND ITS ENVIRONMENT (75) Inventors: Sudeep Bharati, Bellevue, WA (US); Mark Derbecker, Seattle, WA (US); Mark Carroll, Bellevue, WA (US); Corneliu Lupu, Sammamish, WA (US)

(73) Assignee: Microsoft Corporation, Redmond, MA (US)

( * ) Notice: Subject to any disclaimer, the term of this patent is extended or adjusted under 35 U.S.C. 154(b) by 576 days.

(21) Appl. No.: 10/140,213

(22) Filed: May 6, 2002

(65) Prior Publication Data

US 2003/0208593 A1 Nov. 6, 2003

(51) Int. Cl.
*G06F 15/173* (2006.01)
(52) U.S. Cl. ........................................ 709/224; 714/37
(58) Field of Classification Search ................... 714/38, 714/37; 709/224; 717/131
See application file for complete search history.

(56) References Cited

U.S. PATENT DOCUMENTS

| | | | | |
|---|---|---|---|---|
| 5,768,510 A | * | 6/1998 | Gish | 709/203 |
| 5,835,911 A | * | 11/1998 | Nakagawa et al. | 707/203 |
| 5,991,774 A | * | 11/1999 | Tate et al. | 707/203 |
| 6,049,671 A | | 4/2000 | Slivka et al. | |
| 6,182,249 B1 | * | 1/2001 | Wookey et al. | 714/47 |
| 6,327,617 B1 | | 12/2001 | Fawcett | |
| 6,654,816 B1 | * | 11/2003 | Zaudtke et al. | 710/1 |
| 2002/0129039 A1 | * | 9/2002 | Majewski et al. | 707/200 |
| 2002/0161879 A1 | * | 10/2002 | Richard | 709/223 |
| 2003/0028825 A1 | * | 2/2003 | Hines | 714/37 |
| 2003/0051235 A1 | * | 3/2003 | Simpson | 717/174 |
| 2003/0145083 A1 | * | 7/2003 | Cush et al. | 709/224 |
| 2004/0003131 A1 | * | 1/2004 | Curtis | 709/315 |

OTHER PUBLICATIONS

Brendan Murphy and Ted Gent, "Measuring System and Software Reliability using an Automated Data Collection Process," Quality and Reliability Engineering International, vol. 11, No. 5, pp. 341-353 Oct. 1995, pp. 1-12, Microsoft Research, http://research.microsoft.com/research/pubs/view.aspx?id=792&type=Publication.

* cited by examiner

*Primary Examiner*—Nathan J. Flynn
*Assistant Examiner*—Asghar Bilgrami
(74) *Attorney, Agent, or Firm*—Shook, Hardy & Bacon LLP.

(57) ABSTRACT

The present invention provides a method for collecting information to uniquely identify an application on a client computer upon the occurrence of a reporting event, such as a crash. The method is implemented by providing a client computer having access to a network. In order to uniquely identify the application, the method generates an inventory of selected files stored in at least one directory, normally including the directory containing the application executable file. The method further generates an inventory of system properties for the client computer. The inventories are transmitted via the network to a server computer. Upon receipt by the server computer, the inventory information is compared with corresponding information in a database to determine whether the application can be uniquely identified. If the application can be identified, the user can be notified of a solution or other information in response to the reporting event. If no appropriate response can be found, the inventory data can be retained in the database for future reference.

43 Claims, 4 Drawing Sheets

UNIQUELY IDENTIFYING A CRASHED APPLICATION AND ITS ENVIRONMENT

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present invention relates to a computer system. More specifically, the invention relates to a method for collecting application and computing environment identification information when a software application experiences an error or unintended operation. The invention further relates to transmitting the collected identification information through other computing devices for analysis and possible return communication of a solution.

BACKGROUND OF THE INVENTION

Modern commercial computer software has increasingly become more user friendly. The increased ease of use has often required software of increased complexity. A software manufacturer typically makes substantial efforts to eliminate errors from its software before the software is placed on the market. After a program has been marketed, software manufacturers continue their efforts to locate and correct possible software errors. However, modern applications can represent the compilation of millions of source code lines. Despite the manufacturer's best efforts, errors can remain in software prompting unintended results.

Users of a given piece of commercially available software can number in the hundreds of thousands. With such a large customer base, it can be more difficult for the manufacturer to detect software-related errors that affect a small portion of a user population. Even if such errors are anecdotally reported to the manufacturer, it may be difficult to quickly identify a pattern and provide a possible solution.

To assist software developers in better identifying potential errors, other commercially available software has been developed to collect information upon the occurrence of a program error. One such software is the MICROSOFT WATSON product, which creates a snapshot of a portion of the computer's memory at the time of a crash. The crash is an event that is usually prompted by an error. It prevents the further normal operation of the software and, depending upon the severity of the error, of the computer system itself. Users may be offered an opportunity to transmit the crash data to a given location to provide the manufacturer an opportunity to diagnose the cause of the error.

The crash data can contain information to assist in identifying program errors. However, users ultimately want prompt solutions. The present approaches do not always provide sufficient information to enable a manufacturer to promptly diagnose and address application errors. Specifically, it may be difficult to locate certain software errors unless the application executing at the time of the crash can be adequately identified. For example, installation of a new application on a personal computer often begins by executing a program named "setup.exe." The content of the setup.exe files differs for each application being installed even though the file name "setup.exe" is the same. Thus, if an error occurs during the execution of setup.exe, merely knowing that the setup.exe file produced an error is insufficient to identify the specific application being installed.

In various instances when the application can be sufficiently identified, necessary information concerning the computing environment in which the application was executing at the time of the crash or other error is often unavailable. For example, an operating system upgrade may create incompatibilities between the operating system and a given application. Without knowing the operating system and other computer environment information, a diagnosis of the problem can be more difficult. Similarly, applications often rely on multiple Dynamic Link Library, or DLL, files to provide certain functionality. An application may trigger an error because one of the pertinent DLL files contains errors or has become incompatible with the operating environment. For example, a user may have installed unrelated new software that, unbeknownst to the user, installed a new or outdated version of a DLL file in place of a current version. Thus, the application itself may not require modification because the error was in fact caused by a faulty or outdated DLL file. Without information identifying the application and its computing environment, it can be difficult to accurately diagnose and address errors. Moreover, even if the error could be preliminarily identified, there is no satisfactory method for quickly locating an existing, relevant response for the user.

SUMMARY OF THE INVENTION

To address these limitations, the present invention provides a method for collecting information to identify an application on a client computer upon the occurrence of a reporting event. The reporting event may be an error, a crash, a user request or other desired event. The collected information is transmitted from the client computer to a server computer so that the application can be identified and the client computer user can be notified if a solution or other response is available. The notification is made possible because the solution provider would have used the same method to identify the application.

The method is implemented by providing a client computer having access to a network. In order to identify the application, the method generates an inventory of selected files stored in a directory on the client computer, such as the directory containing the application executable file. The method further generates an inventory of system properties for the client computer. The files selected for the inventory of files may be limited to certain files useful in identifying the application, such as executable files, dynamic link library files, etc. The inventories are transmitted via the network to a server computer following the occurrence of the reporting event.

Upon receipt by the server computer, the inventory information is programatically compared with corresponding information in a database to determine whether the application can be identified. If the application can be identified, the client computer user can be notified via the network of any solution or other information that may respond to the reporting event. If no appropriate response can be found, the inventory data can be retained in the database for future reference. By using the same methods, a federated database can be built where the application information is provided by numerous entities but usable by all.

Additional advantages and novel features of the invention will be set forth in the description which follows, and in part will be apparent to those skilled in the art upon examination of the following, or may be learned by practice of the invention.

BRIEF DESCRIPTION OF THE SEVERAL VIEWS OF THE DRAWINGS

The present invention is described in detail below with reference to the attached drawings figures, wherein.

DETAILED DESCRIPTION OF THE INVENTION

The present invention provides a method that enables an application experiencing errors or other unintended results to be uniquely identified so that a solution or other response may be offered to the application user. The present invention is suitably carried out in a client-server networked computing environment in which the client computer and the server computer are connected via a network, such as the Internet.

In general, following the occurrence of a reporting event, information is collected from the client computer for transmission to the server computer. The reporting event may be any desired occurrence, but could include the occurrence of an application error, a hardware error or a request by a user to diagnose a potentially malfunctioning application. Two types of information are collected from the client computer, either before or after the reporting event, for transmission to the server computer. One, an inventory of files is generated for selected files stored in at least one directory on the client computer. The directory will normally be the directory containing the executable file of the application, but could be other or additional directories. The inventory of selected files may include all of the files in a chosen directory or may be limited to selected files, such as the application executable file, other executable files, dynamic link library files and similar types. The inventory of selected files may similarly include selected files from a subdirectory in the directory containing the application executable file. For each file to be included in the inventory, the inventory will normally contain the file name, the file size, a checksum and other available, desired file properties. Two, an inventory of system properties is generated. Such properties include the name of the operating system in use on the client computer, the operating system version, the name of the manufacturer of the client computer, other applications running at that time, the type of central processing unit in the client computer and similar information.

The two inventories are then formatted in a desired way, such as by using the Extensible Markup Language (XML) format. The resulting formatted information is then transmitted to the server computer via the network after the occurrence of the reporting event. The information is compared against a database of application identification information to determine the precise application and its environment and to determine whether a potential solution or other response for this particular application exists. If the application can be identified and if a solution or other response exists, the response can be transmitted to the user, optionally along with an offer to download a solution, if available. If no appropriate response can be found, the information can be stored in the database for further reference and diagnostic purposes. In a large scale data processing environment, the method of the present invention may be carried out by using a search service that is adapted to compare data from the inventory of selected files and inventory of system properties to a number of databases in order to identify the application in question.

Having briefly described an embodiment of the present invention, an exemplary operating system for the present invention is described below.

Exemplary Operating Environment

Figure 1:
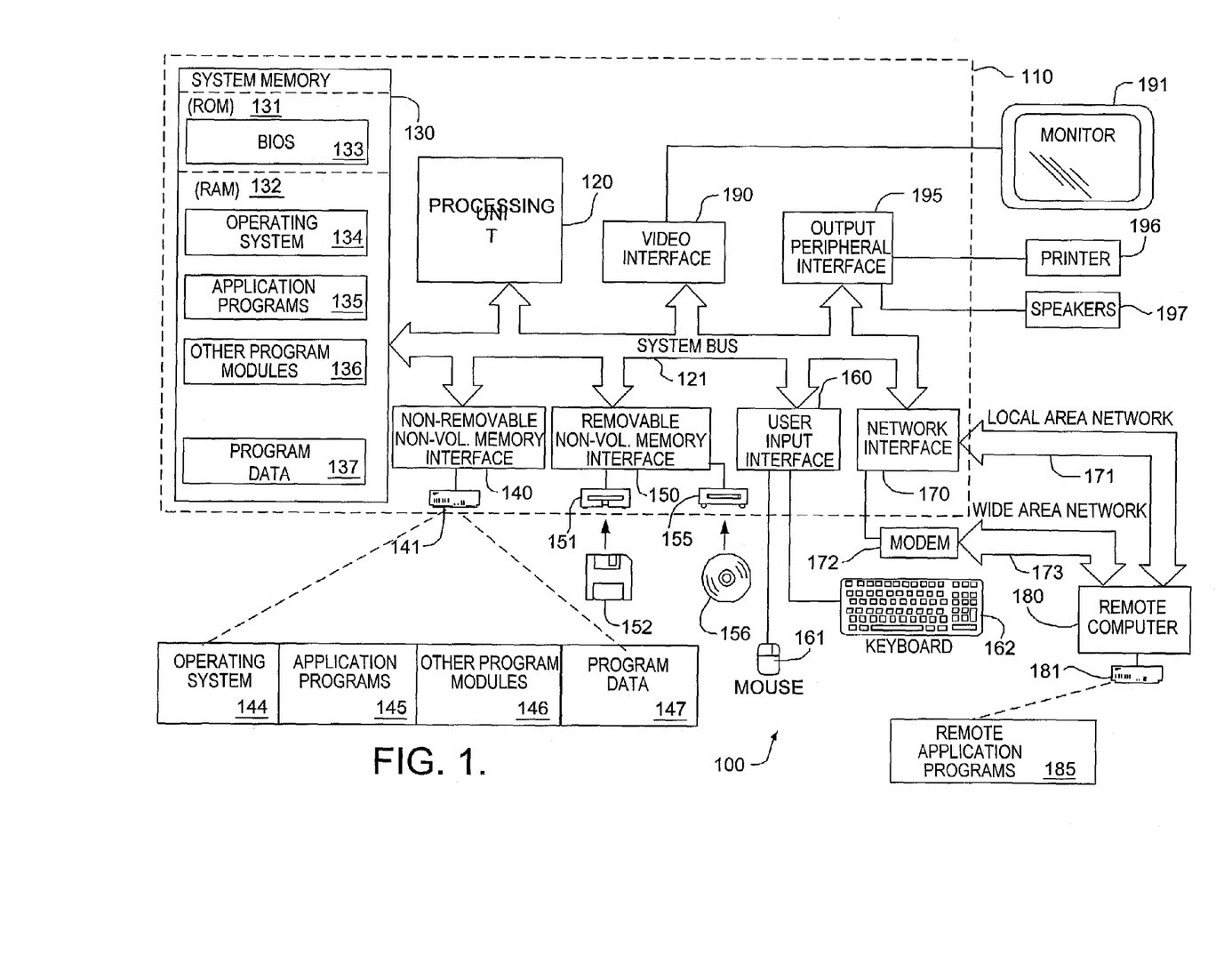
FIG. 1 is a block diagram of a computing system environment suitable for use in implementing the present invention on a client computer.

FIG. 1 illustrates an example of a suitable local computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

UNIQUELY IDENTIFYING A CRASHED APPLICATION

The present invention may be implemented using a personal computer as a client computer having a connection to a network, such as the Internet. A server computer is connected to the same network and adapted to communicate with the client computer.

Figure 2:
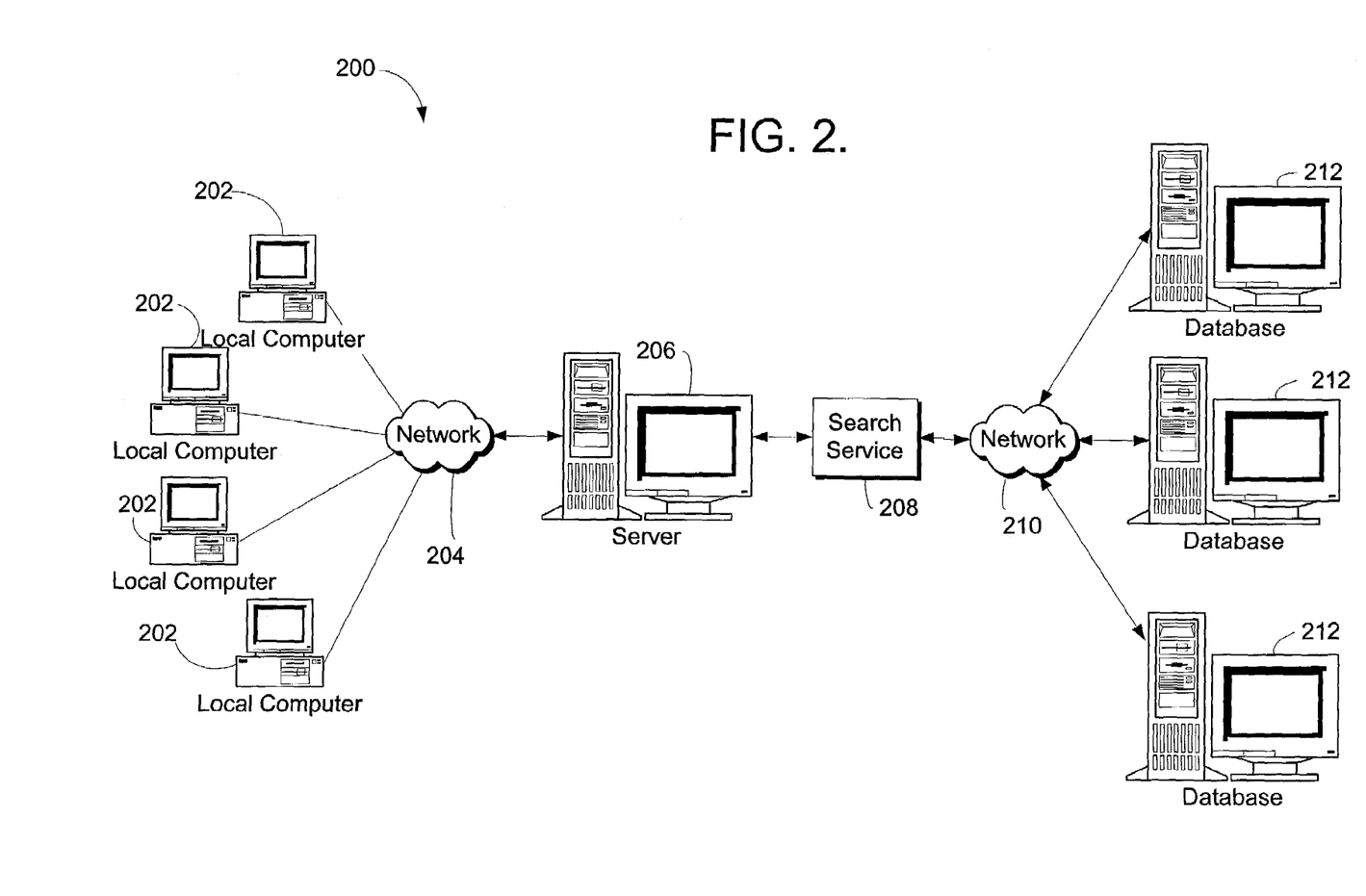
FIG. 2 is a block diagram of the invention in a networked computing system environment.

FIG. 2 illustrates an overall block diagram of the environment in which the present invention may operate. More specifically, the present invention operates in a client-server environment 200 having local computers 202 connected to a server computer 206 via a network 204. The local computers 202 are adapted to transfer data via network 204 such as the Internet, to server computer 206. The data may then be transmitted from server computer 206 to a search service 208 that is adapted to communicate with a plurality of databases 212 containing application identification information to identify an application experiencing a reporting event on local computer 202. The application identification information can include for each of various applications the executable file name, size and checksum. Additional identification information could include the same information for files, such as DLL and other files, known to be associated with a given application. The database 212 likewise may contain information regarding updates, notices, corrections or other information about the identified application. A response can thus be communicated via the network 210 for possible return communication to a local computer 202.

Figure 3:
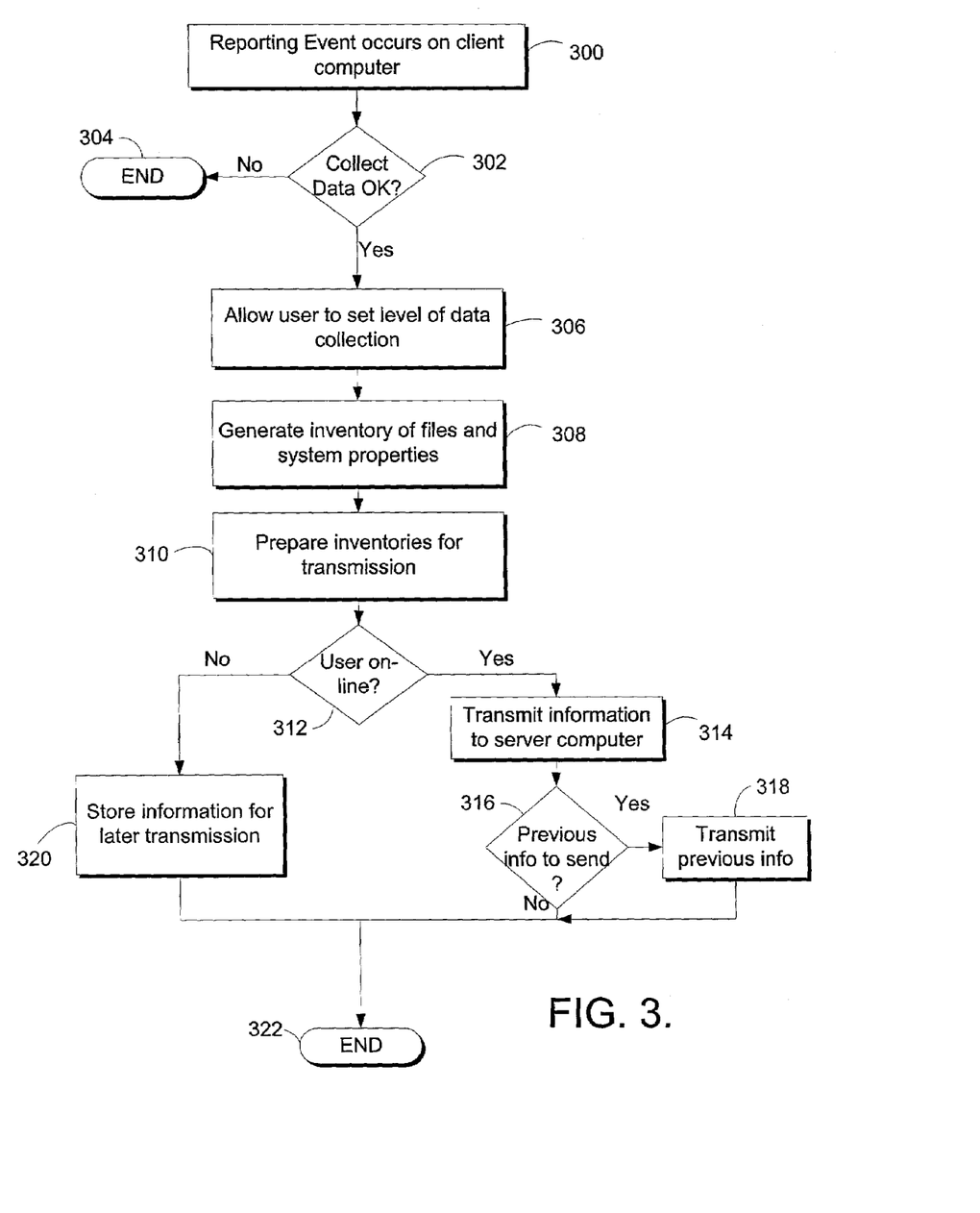
FIG. 3 is a flow chart illustrating an exemplary method for gathering application identification information on a client computer.

FIG. 3 is a flow chart illustrating the method of one embodiment as it would proceed on a client computer. The present method could be implemented in a variety of ways, such as by comprising a portion of an operating system source code, as part of an application or simply as an independent program, such as one written in the programming language C++. As shown at step 300, a reporting event occurs on the client computer. The reporting event may be any desired event after which precise identification of an application is desired. Such events can include the occurrence of an error within the application, a crash, a hardware failure, a request by the user or other similar occurrence. The present invention may rely on other software, such as the MICROSOFT WATSON product or an application, to detect the occurrence of the reporting event and to begin execution of the code embodying the method.

Following the occurrence of the reporting event, control passes to step 302 to determine whether the client computer user has authorized the collection of any information from the client computer. If such data collection has not been authorized, control passes to step 304, processing ends and no information concerning the client computer is collected. If, on the other hand, at step 302, the client computer user has authorized the collection of the requested data, control passes to step 306 wherein the user may be given an opportunity to set forth the types of data that may permissibly be collected. After allowing the user to review and, as desired, limit the information to be collected, control passes to step 308.

At step 308, the method generates an inventory of selected files stored in at least one directory on the client computer. The embodiment may be configured to generate the inventory of selected files from at least one directory that will assist in identifying the application. Such a directory includes the directory containing the application executable file. Using methodologies known by those skilled in the art, the method determines the name of the application to be identified as well as, for example, the name of the directory containing the executable file for the application. The method may be limited to selected files by a developer or the client user, such as executable files, dynamic link library (DLL) file and similar types. For each file to be recorded in the inventory, the inventory of selected files includes the file name, the file size in bytes and a checksum. The checksum may be generated in a variety of ways, such as by performing a 32-bit arithmetic addition on the first 125 32-bit segments in the file, one segment after another and ignoring any overflow, to create a single 32-bit number as the checksum value. Such a checksum, or one generated using another method, provides a number that assists in uniquely identifying the executable or other file in the inventory.

The inventory of files and the inventory of system properties are then, at step 310, prepared for transmission to the server computer wherein the transmission occurs after the occurrence of the reporting event. The information may be formatted for transmission such as by using the Extensible Markup Language (XML) format. As an example, the inventory of selected files for the MICROSOFT MONEY application having an executable version named "msmoney.exe" and, for illustration purposes only, a single dynamic link library file named "msofd.dll" could appear in the XML format as follows:

SIZE: the size of the file in bytes
CHECKSUM: the checksum number generated for the file as described above
BIN_FILE_VERSION: the version of the binary file, if applicable
BIN_PRODUCT_VERSION: the version of the binary file for the product, if applicable
PRODUCT_VERSION: the version number of the product
FILE_DESCRIPTION: a description of the file
COMPANY_NAME: the name of the manufacturer or developer
PRODUCT_NAME: the name of the corresponding application
FILE_VERSION: the file version
ORIGINAL_FILENAME: an original file name
INTERNAL_NAME: a name by which the file may be referenced internally by the manufacturer or developer
LEGAL_COPYRIGHT: copyright information applicable to the file
VERFILEDATEHI, VERFILEDATELO: file date information
VERFILEOS: the version of the operating sysetm
VERFILETYPE: the file type
MODULE_TYPE, PE_CHECKSUM: other descriptive information about the file
LINKER_VERSION: the version of the linker used in conjunction with the file

```
<?xml version="1.0" encoding="UTF-16"?>
<DATABASE>
<EXE NAME="msmoney.exe" FILTER="GRABMI_FILTER_NORMAL">
MATCHING_FILE NAME="msmoney.exe"
    SIZE="28715" CHECKSUM="0xF49D41E2"
    BIN_FILE_VERSION="9.0.0.715" BIN_PRODUCT_VERSION="9.0.0.715"
    PRODUCT_VERSION="9.00.0715"
    FILE_DESCRIPTION="Microsoft Money" COMPANY_NAME="Microsoft
        Corporation"
    PRODUCT_NAME="Microsoft Money" FILE_VERSION="9.00.0715"
    ORIGINAL_FILENAME="MSMoney.EXE"
    INTERNAL_NAME="MSMoney"
    LEGAL_COPYRIGHT="Copyright (C) Microsoft Corp. 1990-2000. All
        rights reserved."
    VERFILEDATEHI="0x0" VERFILEDATELO="0x0" VERFILEOS="0x4"
    VERFILETYPE="0x1" MODULE_TYPE="WIN32" PE_CHECKSUM="0x0"
    LINKER_VERSION="0x0"
    UPTO_BIN_VERSION="9.0.0.715" UPTO_BIN_PRODUCT_VERSION="9.0.0.715"
    LINK_DATE="07/15/2000 03:17:42" UPTO_LINK_DATE="07/15/2000 03:17:42"
    VER_LANGUAGE="English (United States) [0x409]">
        <MATCHING_FILE NAME="msofd.dll" SIZE="1962028"
    CHECKSUM="0x96F7E0E4"
    BIN_FILE_VERSION="9.0.0.715" BIN_PRODUCT_VERSION="9.0.0.715"
    PRODUCT VERSION="9.00.0715"
    FILE_DESCRIPTION="Microsoft OFD Interface Library"
    COMPANY_NAME="Microsoft Corporation"
    PRODUCT_NAME="Microsoft Money" FILE VERSION="9.00.0715"
    ORIGINAL_FILE_NAME="MSOFD.DLL"
    INTERNAL_NAME="MSOFD" LEGAL_COPYRIGHT="Copyright (C) Microsoft
    Corp. 1990-2000. All rights reserved."
    VERFILEDATE="0x0" VERFILEDATELO="0x0" VERFILEOS="0x4"
    VERFILETYPE="0x2" MODULE_TYPE="WIN32" PE_CHECKSUM="0x1EDC68"
    LINKER_VERSION="0x0"
    UPTO_BIN_FILE_VERSION="9.0.0.715"
    UPTO_BIN_PRODUCT_VERSION="9.0.0.715"
    LINK_DATE="07/15/2000 04:45:12" UPTO_LINK_DATE="07/15/2000 04:45:12"
    VER_LANGUAGE="English (United States) [0x409]">
```

The XML tags shown above could describe the information as follows:

MATCHING_FILE NAME: the name of the file being placed in the inventory

UPTO_BIN_VERSION, UPTO_BIN_PRODUCT_VERSION,

LINK DATE, UPTO_LINK_DATE: other possible identifying information

VER_LANGUAGE: the natural language of the file version (e.g. English language version)

As will be understood by those skilled in the art, the file systems of computer operating systems, such as the MICROSOFT WINDOWS XP, product normally allow most of the above properties to be stored by the creator of the file at the time of file creation or thereafter.

The embodiment further generates an inventory of system properties for the client computer as will be appreciated by those skilled in the art. The inventory of system properties could likewise be formatted using the XML format as follows:

```
<SYS_INFO NAME="OS Name" VALUE="Microsoft Windows XP Professional">
<SYS_INFO NAME="Version" VALUE="5.1.2505 Build 2505"/>
<SYS_INFO NAME="OS Manufacturer" VALUE="Microsoft Corporation"/>
<SYS_INFO NAME="System Name" VALUE="TEST1"/>
<SYS_INFO NAME="System Manufacturer" VALUE="Dell Computer Corporation"/>
<SYS_INFO NAME="System Model" VALUE="XPS-Z"/>
<SYS_INFO NAME="System Type" VALUE="X86-based PC"/>
<SYS_INFO NAME="Processor" VALUE="x86 Family 6 Model 8 Stepping 6 GenuineIntel
    ~930 Mhz"/>
<SYS_INFO NAME="BIOS Version/Date" - VALUE="Intel Corp. A05, 9/22/2000"/>
<SYS_INFO NAME="SMBIOS Version" VALUE="2.3"/>
<SYS_INFO NAME="Windows Directory" VALUE="C:\RC1"/>
<SYS_INFO NAME="System Directory" VALUE="C:\RC1\System32"/>
<SYS_INFO NAME="Boot Device" VALUE="\Device\HarddiskVolume1"/>
<SYS_INFO NAME="Locale" VALUE="United States"/>
</DATABASE>
```

The above XML information could have the following usages:

OS Name: the name of the operating system in use on the client computer

Version: the version of the operating system in use on the client computer

OS Manufacturer: the manufacturer of the operating system in use on the client computer System Name: the name of the client computer, if any System Manufacturer: the manufacturer of the client computer System Model: the model of the client computer System Type: the type of central processing unit in the client computer Processor: the model of central processing unit in the client computer BIOS Version/Date: the version and date of the Basic Input/Output System (BIOS) for the client computer SMBIOS Version: the version and date of the System Management BIOS for the client computer Windows Directory: the directory path containing the MICROSOFT WINDOWS operating system software System Directory: the directory path containing the MICROSOFT WINDOWS system directory for the operating system Boot Device: the storage device from which the client computer boots Locale: a geographic location of the client computer As noted above, the method of the present invention may further limit the inventory of selected files to files of certain file types. This would include limiting the inventory, for example, to include the application executable file, other executable files, dynamic link library files, or similar files. Additionally, all other files may be optionally included in the inventory up to a desired maximum, such as no more than ten additional unique file types per directory. After the inventory information has been prepared for transmission at step 310, control passes to step 312, where it is determined whether the client computer has a current Internet connection. If not, the information is stored on a storage device accessible by the client computer, such as a hard disk at step 320 for later transmission, and the present method terminates at step 322.

If on the other hand at step 312, the client computer has an active network connection, such as a connection to the Internet, control passes to step 314, and the inventory of selected files and the inventory of system properties are transmitted to the server computer at step 314. Control then passes to step 316 to determine whether there is any previously stored inventory information that has not been sent. If so, then the previous inventory information is transmitted at step 318 and, in either event, control then passes to step 322, at which point the method may terminate.

Figure 4:
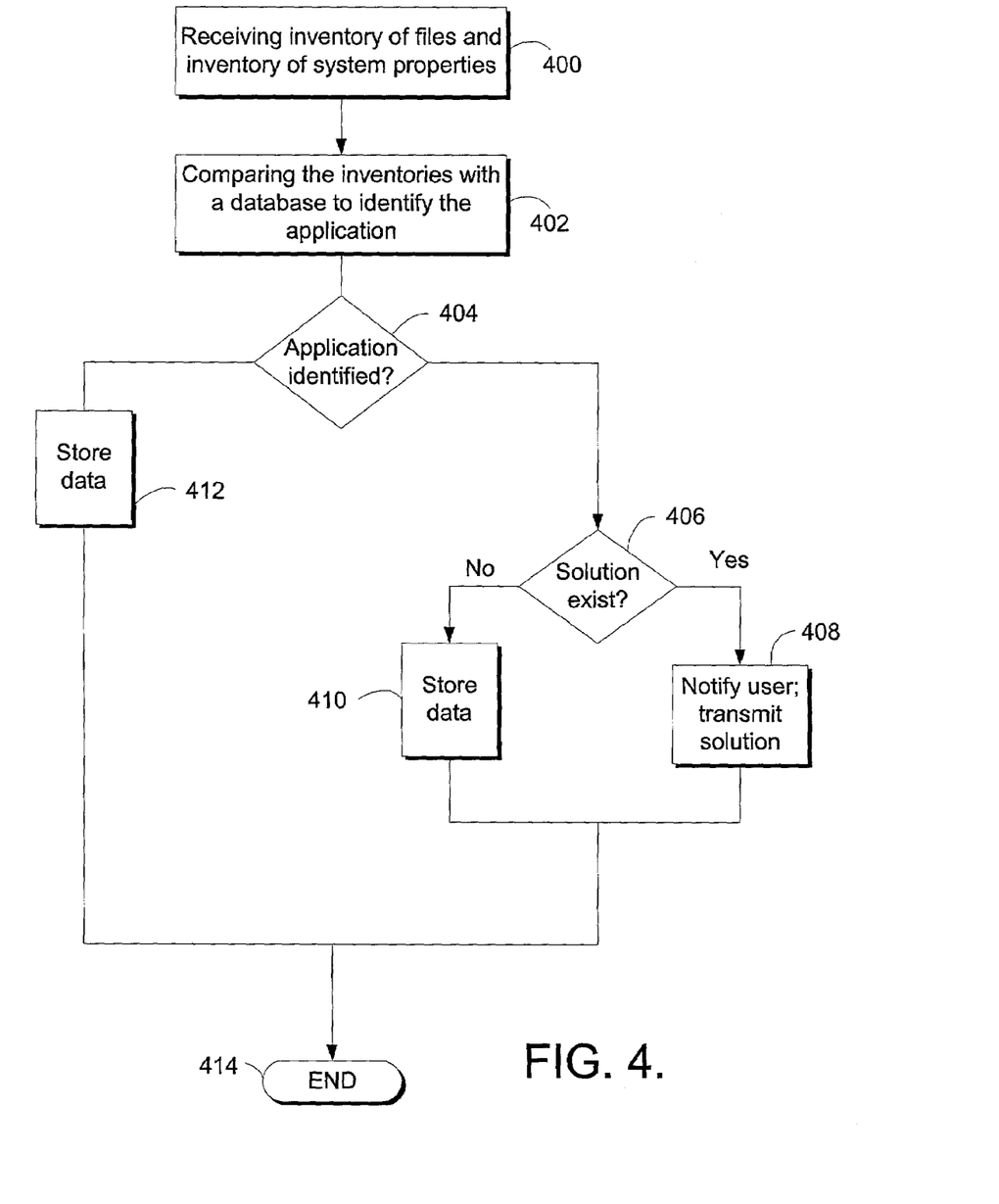
FIG. 4 is a flow chart illustrating an exemplary method for processing application identification information on a server computer.

FIG. 4 illustrates another embodiment utilizing a server computer in communication with a database. As noted above, the embodiment operates in a client-server computing environment containing a server computer adapted to receive information from a client computer. In this context, the server computer can be implemented using hardware suitable for an Internet web server and corresponding web server software, such as the MICROSOFT INTERNET INFORMATION SERVER product. The database can be implemented using a relational database, such as the MICROSOFT SQL DATABASE product.

The database may reside on the server computer or may reside on a separate computer in communication with the server computer via a network such as the Internet. Likewise, the database may reside on media such as a CD-ROM accessible using a CD-ROM drive associated with the server computer. The database contains at least one table having fields corresponding to the individual items of identifying information sought for the inventory of selected files and inventory of system properties. Additional tables may be included to assist in managing the collected information, such as one table for containing data on software from a specific manufacturer and another table containing data concerning software from other manufacturers. Fields in the table could include file name, file size in bytes, checksum, associated application and other fields for the inventory data described above. Fields could likewise be included in the database concerning a response, solution or other information to be communicated concerning an application. The fields contain data concerning desired known applications to assist in identifying applications received from client computers. For example, a software manufacturer could populate the fields with data corresponding to the manufacturer's applications, such that the file name, file size, checksum and other desired inventory information would be stored in the database for files associated with each of the manufacturer's applications and for other known applications.

The method of the present embodiment as illustrated at FIG. 4 begins at step 400 by receiving on the server computer via a network, such as the Internet, an inventory of selected files stored in a directory on the client computer, such as a directory containing the application executable file. Similarly, the server computer receives an inventory of system properties for the client computer. At step 402, the server computer then communicates with a database 212 to compare data from the inventory of selected files and data from the inventory system properties with corresponding data in the database to identify the application. Such comparisons could include searching for occurrences of the name of the application, the file name of the executable file for the application, the version number, the build number, and the names of the selected supplemental files, such as dynamic link library files. The number of matches can thereby be tabulated to uniquely identify the application in question so that a specific targeted solution or other response may further be located in the database or other on-line data. If the application has been identified, then at step 404, control passes to step 406 to determine if a solution exists either as noted in the database or from other on-line data. If at step 406 a solution or other response is determined to exist, the user can be notified at step 408 and offered the opportunity to receive the solution or other response. If on the other hand at step 406, no appropriate solution or response is found, then at step 408 the inventory information can be added to the database at 410 and processing ends at step 414. If on the other hand, at step 404 the application cannot be identified, then the inventory information can be added to the database at step 412, and control passes to step 414 where the process may terminate.

For large-scale data collecting, another embodiment could include using the above-described method with a plurality of databases and a search service, or separate process, for conducting a search across multiple databases. As will be understood by those skilled in the art, such a solution could include one implemented using the MICROSOFT C# programming language within the MICROSOFT VISUAL .NET product environment. In such a configuration, the search service receives inventory information from the server computer and conducts a search of corresponding data among the plurality of databases as described above for a single database.

In operation, a user could be running an application such as the MICROSOFT MONEY product on local computer 202. An unintended software event occurs, such as a crash or other reporting event at step 300. Thereupon, the user may be offered an opportunity to determine whether data for identifying the application may be collected at step 302. If the user declines to authorize such data collection, then at step 304 processing ends. If on the other hand, the user allows the collection of information concerning the reporting event, the user may be given an opportunity at step 306 to set the types of data to be collected. Thereafter, an inventory of files in at least one selected directory, such as the directory containing the MICROSOFT MONEY executable file, and an inventory system properties for the local computer 202 are generated. The inventory of selected files and inventory of system properties are formatted in preparation for transmission at step 310 into the Extensible Markup Language (XML) format. If local computer 202 is on-line at step 312, the inventory information is transmitted to a server computer at step 314. If at step 316 any previously untransmitted inventory information is detected, then at step 318, the previous inventory information is likewise sent and processing ends at step 322. If on the other hand, no active connection to the Internet then exists, control passes to step 320 and the information is stored for later transmission.

After the server computer receives the inventory of selected files and the inventory of system properties for the client computer, the inventory of selected files and inventory of system properties is compared with corresponding data in a database containing the application identification information to identify the application. Upon identifying a solution or other response at step 406, the user is notified so that after the user experiences an application crash using the given application, the solution or other response can be delivered to the user.

From the foregoing, the invention can be seen to provide a software user with a valuable way to obtain a solution to errors or other problems experienced with an application or hardware device. By enabling software manufacturers to uniquely identify an application on a client computer, and not just simply to receive crash data, the software manufacturer is better able to reproduce and debug an error and then to distribute a solution for the referenced problem. The crash information thus becomes much more useful because it is associated with a unique application and its environment. Additional and alternative embodiments of the present invention may become apparent to those skilled in the art to which it pertains upon review of the specification, including drawing figures. The various computer systems and components shown in FIGS. 1-4 and described in the specification are merely exemplary of those suitable for use in connection with the present invention. Accordingly, the scope of the present invention is defined by the appended claims rather than the foregoing description.

We claim:

1. In a client-server computing environment, a method for collecting data to identify an application whose executable file is stored in a directory on a client computer, the data being for transmission to a server computer via a network after an occurrence of a reporting event, the reporting event being a crash during installation of an application and occurring prior to any application-specific runtime routines being initiated, the method comprising: generating an inventory of selected files stored in at least one directory on the client computer, the inventory including at least one installation file associated with the installation of the application and at least one additional unique identifier of the application; generating an inventory of system properties for the client computer; directing the client computer to transmit the inventory of selected files and the inventory of system properties to the server computer; and identifying the application being installed upon the occurrence of the crash; directing the client computer to transmit the inventory of selected files and the inventory of system properties to the server computer via a network; determining whether the client computer has an available connection to the Internet and: (1) if so, directing the client computer to transmit the inventory of selected files and the inventory of system properties to the server computer via the Internet; (2) if not, storing the inventory of selected files and the inventory of system properties on a storage device accessible by the client computer and determining the storage device includes a previous inventory of selected files that was created following a previous reporting event and a previous inventory of system properties that was created following a previous reporting event directing the client computer to transmit the previous inventory of selected files and the previous inventory of system properties to the server computer via the Internet.

2. The method of claim 1, wherein the selected files include executable files.

3. The method of claim 1, wherein the selected files include dynamic link library files.

4. The method of claim 1, wherein the at least one directory on the client computer includes the directory containing the application executable file.

5. The method of claim 4, wherein the at least one directory on the client computer includes a subdirectory of the directory containing the application executable file.

6. The method of claim 1, wherein the inventory of selected files includes file properties for at least one file in the inventory of files.

7. The method of claim 1, wherein the inventory of selected files includes a checksum for at least one file in the inventory of files.

8. The method of claim 1, wherein the step of directing the client computer to transmit the inventory of selected files and the inventory of system properties further includes preparing the inventory of selected files and the inventory of system properties for transmission in the Extensible Markup Language (XML) format.

9. The method of claim 1, wherein the reporting event is an error occurring on the client computer while the application is executing.

10. The method of claim 1, wherein the reporting event is a request by a user of the client computer.

11. The method of claim 1, further comprising determining whether the client computer successfully transmitted the inventory of selected files and the inventory of system properties to the server computer and, if not, storing the inventory of selected files and the inventory of system properties on a storage device accessible by the client computer.

12. The method of claim 11, further comprising:
determining whether a previous inventory of selected files and a previous inventory of system properties created following a previous reporting event exists on the storage device and, if so, directing the client computer to transmit the previous inventory of selected files and the previous inventory of system properties to the server computer via the network.

13. A computer-readable storage media having computer-executable instruction for performing the method recited in claim 1.

14. In a client-server computing environment, a method for collecting data to identify an application whose executable file is stored in a directory on a client computer, the data being for transmission to a server computer after an occurrence of a reporting event, the reporting event being a crash during installation of an application and occurring prior to any application-specific runtime routines being initiated, the method comprising: generating an inventory of selected files stored in the directory containing the application executable file, the inventory including at least one installation file associated with the installation of the application and at least one additional unique identifier of the application; generating an inventory of system properties for the client computer; preparing the inventory of selected files and the inventory of system properties for transmission to the server computer after the occurrence of the reporting event; and identifying the application being installed upon the occurrence of the crash; directing the client computer to transmit the inventory of selected files and the inventory of system properties to the server computer via a network; determining whether the client computer has an available connection to the Internet and: (1) if so, directing the client computer to transmit the inventory of selected files and the inventory of system properties to the server computer via the Internet; (2) if not, storing the inventory of selected files and the inventory of system properties on a storage device accessible by the client computer and determining the storage device includes a previous inventory of selected files that was created following a previous reporting event and a previous inventory of system properties that was created following a previous reporting event directing the client computer to transmit the previous inventory of selected files and the previous inventory of system properties to the server computer via the Internet.

15. The method of claim 14, wherein the selected files include executable files.

16. The method of claim 14, wherein the selected files include dynamic link library files.

17. The method of claim 14, wherein the step of generating an inventory includes generating an inventory of selected files for a subdirectory of the directory containing the application executable file.

18. The method of claim 14, wherein the inventory of selected files includes file properties for at least one file in the inventory of files.

19. The method of claim 14, wherein the inventory of selected files includes a checksum for at least one file in the inventory of files.

20. The method of claim 14, wherein the step of preparing the inventory of selected files further includes preparing the inventory of selected files and the inventory of system properties for transmission in the Extensible Markup Language (XML) format.

21. The method of claim 14, wherein the reporting event is an error occurring on the client computer while the application is executing.

22. The method of claim 14, wherein the reporting event is a request by a user of the client computer.

23. The method of claim 14, further comprising directing the client computer to transmit the inventory of selected files and the inventory of system properties to the server computer via the Internet.

24. The method of claim 14, further comprising determining whether the client computer has an available connection to the Internet and, if so, directing the client computer to transmit the inventory of selected files and the inventory of system properties to the server computer via the Internet.

25. The method of claim 24, further comprising storing the inventory of selected files and the inventory of system properties on a storage device accessible by the client computer if the client computer has no available connection to the Internet.

26. The method of claim 25 further comprising:
determining whether a previous inventory of selected files and a previous inventory of system properties created following a previous reporting event exists on the storage device and, if so, directing the client computer to transmit the previous inventory of selected files and the previous inventory of system properties to the server computer via the network.

27. A computer-readable storage media having computer-executable instruction for performing the method recited in claim 14.

28. In a client-server computing environment, a method for collecting data to identify an application whose executable file is stored in a directory on a client computer, the data being for transmission to a server computer after an occurrence of a reporting event, the reporting event being a crash during installation of an application and occurring prior to any application-specific runtime routines being initiated, the method comprising:

generating an inventory of selected files stored in the directory containing the application executable file, wherein the selected files include executable files stored in the directory, wherein the inventory of selected files includes for each file included therein at least a file name, a file size and a checksum, and wherein the selected files include at least one unique identifier of the application in addition to the application executable file;

generating an inventory of system properties for the client computer;

preparing the inventory of files and the inventory of system properties for transmission to the server computer in the Extensible Markup Language (XML) format after the occurrence of the reporting event;

identifying the application being installed upon the occurrence of the crash;

directing the client computer to transmit the inventory of selected files and the inventory of system properties to the server computer via a network;

determining whether the client computer has an available connection to the Internet and:
(1) if so, directing the client computer to transmit the inventory of selected files and the inventory of system properties to the server computer via the Internet;
(2) if not, storing the inventory of selected files and the inventory of system properties on a storage device accessible by the client computer; and determining that the storage device includes a previous inventory of selected files that was created following a previous reporting event and a previous inventory of system properties that was created following a previous reporting event and directing the client computer to transmit the previous inventory of selected files and the previous inventory of system properties to the server computer via the Internet.

29. The method of claim 28, wherein the directory containing the application executable file includes a subdirectory thereof.

30. The method of claim 28, wherein the reporting event is an error occurring on the client computer while the application is executing.

31. The method of claim 28, wherein the reporting event is a request by a user of the client computer.

32. A computer-readable storage media having computer-executable instruction for performing the method recited in claim 28.

33. In a networked client-server computing environment having a server computer and a database containing application identification information, a method for identifying an application on a client computer after an occurrence of a reporting event, the reporting event being a crash during installation of an application and occurring prior to any application-specific runtime routines being initiated, the method comprising:

receiving on the server computer an inventory of selected files stored in at least one directory on the client computer, the inventory including at least one installation file associated with the installation of the application and at least one additional unique identifier of the application; receiving on the server computer an inventory of system properties for the client computer; comparing data from the inventory of selected files and data from the inventory of system properties with corresponding data in the database to identify the application; and identifying the application being installed upon the occurrence of the crash; directing the client computer to transmit the inventory of selected files and the inventory of system properties to the server computer via a network; determining whether the client computer has an available connection to the Internet and: (1) if so, directing the client computer to transmit the inventory of selected files and the inventory of system properties to the server computer via the Internet; (2) if not, storing the inventory of selected files and the inventory of system properties on a storage device accessible by the client computer and determining the storage device includes a previous inventory of selected files that was created following a previous reporting event and a previous inventory of system properties that was created following a previous reporting event directing the client computer to transmit the previous inventory of selected files and the previous inventory of system properties to the server computer via the Internet.

34. The method of claim 33, further including determining, upon identification of the application, whether a response to the reporting event exists for the application.

35. The method of claim 34, further including transmitting the response to the client computer if a response to the reporting event exists for the application.

36. The method of claim 33, wherein the inventory of files includes the file properties for each file included therein.

37. The method of claim 36, wherein the file properties include at least a file name, a file size and a checksum.

38. The method of claim 37, wherein the step of comparing data from the inventory of files includes comparing the file name, file size and checksum contained in the inventory of files with corresponding data in the database to identify the application.

39. In a networked client-server computing environment having a server computer and a database containing application identification information, a method for identifying an application on a client computer after an occurrence of a reporting event, the reporting event being a crash during installation of an application and occurring prior to any application-specific runtime routines being initiated, the method comprising:

receiving on the server computer an inventory of files stored in a directory on the client computer containing the application executable file wherein the inventory of files includes file properties for each file included therein, wherein the file properties include at least a file name, a file size and a checksum, and wherein the selected files include at least one unique identifier of the application in addition to the application executable file; receiving on the server computer an inventory of system properties for the client computer; comparing data from the inventory of files, including the file name, the file size and the checksum, and data from the inventory of system properties with corresponding data in the database to identify the application; determining, upon identification of the application, whether a response to the reporting event exists for the application and, if so, transmitting the response to the client computer; and identifying the application being installed upon the occurrence of the crash; directing the client computer to transmit the inventory of selected files and the inventory of system properties to the server computer via a network; determining whether the client computer has an available connection to the Internet and: (1) if so, directing the client computer to transmit the inventory of selected files and the inventory of system properties to the server computer via the Internet; (2) if not, storing the inventory of selected files and the inventory of system properties on a storage device accessible by the client computer and determining the storage device includes a previous inventory of selected files that was created following a previous reporting event and a previous inventory of system properties that was created following a previous reporting event directing the client computer to transmit the previous inventory of selected files and the previous inventory of system properties to the server computer via the Internet.

40. In a networked client-server computing environment having a server and a plurality of databases each containing application identification information, a method for identifying an application on a client computer after the occurrence of a reporting event, the reporting event being a crash during installation of an application and occurring prior to any application-specific runtime routines being initiated, the method comprising: receiving on the server computer an inventory of files stored in a directory on the client computer containing the application executable file, the inventory including at least one installation file associated with the installation of the application and at least one additional unique identifier of the application; receiving on the server computer an inventory of system properties for the client computer; executing a search service that compares data from the inventory of files and data from the inventory of system properties with corresponding data in at least one of the plurality of databases to identify the application; and identifying the application being installed upon the occurrence of the crash; directing the client computer to transmit the inventory of selected files and the inventory of system properties to the server computer via a network; determining whether the client computer has an available connection to the Internet and: (1) if so, directing the client computer to transmit the inventory of selected files and the inventory of system properties to the server computer via the Internet; (2) if not, storing the inventory of selected files and the inventory of system properties on a storage device accessible by the client computer and determining the storage device includes a previous inventory of selected files that was created following a previous reporting event and a previous inventory of system properties that was created following a previous reporting event directing the client computer to transmit the previous inventory of selected files and the previous inventory of system properties to the server computer via the Internet.

41. The method of claim 40, further comprising determining, upon identification of the application, whether a response to the reporting event exists for the application.

42. The method of claim 40, further comprising transmitting the response to the client computer if a response to the reporting event exists for the application.

43. The method of claim 40, further comprising recording the occurrence of the reporting event in one of the plurality of databases.

* * * * *